US012741660B2

(12) United States Patent
Park

(10) Patent No.: US 12,741,660 B2
(45) Date of Patent: Sep. 22, 2026

(54) VEHICLE AND METHOD FOR INFORMING U-TURN THEREOF

(71) Applicants: Hyundai Motor Company, Seoul (KR); Kia Corporation, Seoul (KR)

(72) Inventor: Byoung Sun Park, Seoul (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 0 days.

(21) Appl. No.: 18/816,056

(22) Filed: Aug. 27, 2024

(65) Prior Publication Data

US 2025/0187623 A1 Jun. 12, 2025

(30) Foreign Application Priority Data

Dec. 7, 2023 (KR) ........................ 10-2023-0176448

(51) Int. Cl.
*B60W 50/14* (2020.01)
*B60Q 1/38* (2006.01)
*B60W 30/18* (2012.01)

(52) U.S. Cl.
CPC ............... *B60W 50/14* (2013.01); *B60Q 1/38* (2013.01); *B60W 30/18036* (2013.01); *B60W 2050/146* (2013.01); *B60W 2540/215* (2020.02); *B60W 2552/10* (2020.02); *B60W 2552/53* (2020.02); *B60W 2554/80* (2020.02)

(58) Field of Classification Search
CPC ........... B60W 50/14; B60W 30/18036; B60W 2050/146; B60W 2540/215; B60W 2552/10; B60W 2552/53; B60W 2554/80; B60Q 1/38; B60K 35/10; B60K 35/28; B60K 2360/1868; B60Y 2300/18008
See application file for complete search history.

(56) References Cited

U.S. PATENT DOCUMENTS 5,654,892 A * 8/1997 Fujii .................... G08G 1/0969 73/178 R
8,996,224 B1 * 3/2015 Herbach ............ B60W 60/0011 701/25
2020/0319644 A1 * 10/2020 Li ....................... B60W 60/001

* cited by examiner

*Primary Examiner* — Rajsheed O Black-Childress
(74) *Attorney, Agent, or Firm* — Slater Matsil, LLP

(57) ABSTRACT

A vehicle and a method for guiding U-turn can include, based on a first event in which the vehicle approaches a U-turn point, displaying first information on a U-turn to be made, where the first information includes an indication that the U-turn will be made soon and a type of U-turn, and based on a second event in which the vehicle waits to initiate the U-turn, displaying second information on the U-turn to be made.

20 Claims, 12 Drawing Sheets

VEHICLE AND METHOD FOR INFORMING U-TURN THEREOF

CROSS-REFERENCE TO RELATED APPLICATIONS

This application is based on and claims priority to Korean Patent Application Number 10-2023-0176448, filed on Dec. 7, 2023, the disclosure of which is incorporated by reference herein in its entirety.

TECHNICAL FIELD

The present disclosure relates to a vehicle and a method for guiding U-turn thereof.

BACKGROUND

The statements in this Background section merely provide background information related to the present disclosure and do not necessarily constitute prior art that is publicly known, available, or in use.

Autonomous vehicles establish a driving route according to the destination set by the user and drive autonomously by following the driving route. Concurrently, the set driving route may include a U-turn route.

To make a U-turn, the vehicle often needs to abruptly turn the steering wheel and cross the center line. Additionally, depending on the road conditions, the vehicle may need to make a skewed U-turn or fail to make a U-turn in one go, resorting to a multipoint turn involving reverse and forward maneuvers during the U-turn. In the context of autonomous vehicles, the user may experience discomfort and anxiety during complex maneuvers for the U-turn.

SUMMARY

The present disclosure relates to a vehicle and a method for guiding U-turn thereof.

According to at least one embodiment of the present disclosure, a method performed by an apparatus of a vehicle can include, based on a first event in which the vehicle approaches a U-turn point, displaying first information on a U-turn to be made, where the first information can include an indication that the U-turn will be made soon and a type of U-turn. The method can further include, based on a second event in which the vehicle waits to initiate the U-turn, displaying second information on the U-turn to be made.

In some embodiments, the method may further include determining whether at least one U-turn is required on a driving route to a destination set by a user, based on a determination that at least one U-turn is required, displaying third information on the required U-turn, and, providing an interface to allow the user to select an alternate route that requires a different type of U-turn than the driving route, or does not require any U-turns.

In some embodiments, the method may further include displaying fourth information on the U-turn in progress while making the U-turn. The fourth information may include distance to a surrounding object and a lane marking. In some embodiments, the method may further include indicating that U-turn in progress to a surrounding vehicle using a lamp mounted while making the U-turn.

According to an embodiment of the present disclosure, a vehicle can include a memory storing instructions, and at least one processor. The at least one processor, when executing the instructions, can be configured to, based on a first event in which the vehicle approaches a U-turn point, control a user interface to output first information on a U-turn to be made, where the first information includes an indication that the U-turn will be made soon and a type of U-turn. The at least one processor can be further configured to, based on a second event in which the vehicle waits to initiation the U-turn, control the user interface to output second information on the U-turn to be made.

In some embodiments, the at least one processor may be further configured to control the user interface to, based on a determination that at least one U-turn is required on a driving route to a destination set by a user, output third information on the required U-turn and provide an interface to allow the user to select an alternate route that requires a different type of U-turn than the driving route, or does not require any U-turns.

In some embodiments, the at least one processor may be further configured to control the user interface to display fourth information on the U-turn in progress on the user interface unit. The fourth information may include distance to a surrounding object and a lane marking.

In some embodiments, the at least one processor may be further configured to control a lamp installed in the vehicle to indicate that U-turn in progress to a surrounding vehicle while making the U-turn.

In some embodiments, the type of U-turn can be determined from among a plurality of U-turn types. The plurality of U-turn types may include a first-type U-turn that allows the vehicle to complete a corresponding U-turn without reversing. Additionally or alternatively, the plurality of U-turn types may include a second-type U-turn that requires the vehicle to perform at least one reverse movement to complete a corresponding U-turn. Additionally or alternatively, the plurality of U-turn types may include a third-type U-turn that allows the vehicle to initiate a corresponding U-turn from a center of an original lane. Additionally or alternatively, the plurality of U-turn types may include a fourth-type U-turn that requires the vehicle to be positioned towards the side of the original lane before initiating a corresponding U-turn. The fourth-type U-turn may include a fifth-type U-turn that requires the vehicle to temporarily encroach upon an outside lane marking of a target lane during a corresponding U-turn. Additionally or alternatively, the fourth-type U-turn may include a sixth-type U-turn that requires the vehicle to temporarily encroach upon an outside lane marking of the original lane during a corresponding U-turn.

In some embodiments, a type of U-turn may be determined among the types of U-turns based on the lane width of a road where the U-turn is to be made, the number of lanes of the road where the U-turn is to be made, a turning radius of the vehicle, and a front overhang of the vehicle.

In some embodiments, the second information may include a planned U-turn trajectory corresponding to the type of U-turn.

DETAILED DESCRIPTION OF ILLUSTRATIVE EMBODIMENTS

Figure 1:
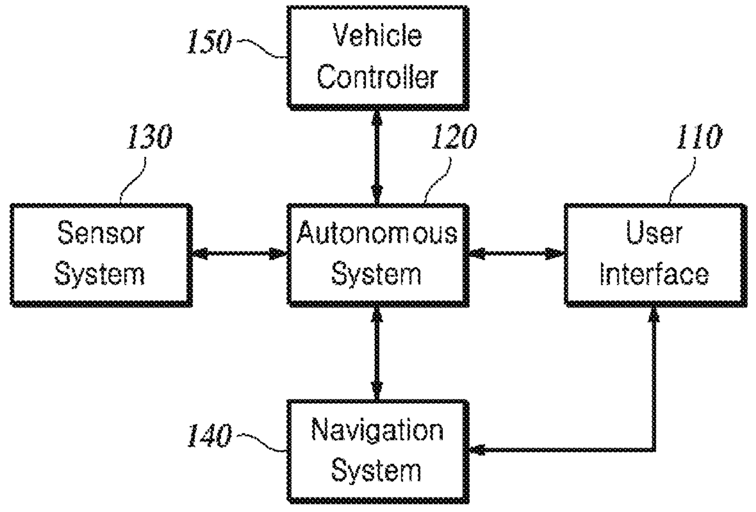
FIG. 1 is a block diagram illustrating a configuration of an autonomous vehicle system according to at least one embodiment of the present disclosure.

Some embodiments of the present disclosure can provide a method and vehicle for informing a user of a U-turn maneuver thereby enabling the user to feel reassured.

Some embodiments of the present disclosure can provide a U-turn informing method and autonomous vehicle that can efficiently inform a user in advance with details when a U-turn entry is required along the route of the vehicle.

Some embodiments of the present disclosure can provide a U-turn informing method and autonomous vehicle that allows a user to take account of different situations for selecting a different route than a U-turn even when guided to be required along the route of the vehicle.

Some embodiments of the present disclosure can provide a U-turn informing method and autonomous vehicle that can efficiently inform a user on how it will perform a U-turn according to the vehicle and road conditions when a U-turn is required along the route of the vehicle.

Some embodiments of the present disclosure can provide a U-turn informing method and autonomous vehicle that can intuitively present a U-turn type, selected based on vehicle and road conditions, to a user in advance when a U-turn entry is required along the route of the vehicle.

Possible embodiments of the present disclosure are not limited to those examples particularly described hereinabove, and the above and other embodiments that the present disclosure can achieve can be understood by those skilled in the art from the following detailed description.

Hereinafter, some example embodiments of the present disclosure will be described in detail with reference to the accompanying drawings. In the following description, like reference numerals can designate like elements, although the elements are shown in different drawings. Further, for the purpose of clarity and for brevity, the following description of some embodiments can omit a detailed description of related known components and functions when considered obscuring the present disclosure.

Various ordinal numbers or alpha codes such as "first", "second", "i)", "ii)", "a)", "b)", etc., can be prefixed to differentiate one component from the other but not to necessarily imply or suggest the substances, order, or sequence of the components. Throughout this specification, when a part "includes" or "comprises" a component, the part can further include other components, unless specifically stated to the contrary. The terms such as "unit," "module," and the like can refer to units in which at least one function or operation can be processed and they may be implemented by hardware, software, or a combination thereof.

The description of the present disclosure to be presented below in conjunction with the accompanying drawings is intended to describe example embodiments of the present disclosure and is not intended to represent the only embodiments in which technical ideas of the present disclosure may be practiced.

FIG. 1 is a block diagram illustrating a configuration of an autonomous vehicle according to at least one embodiment of the present disclosure.

A user interface 110 may include input systems for receiving control commands from a user and output systems for outputting information related to autonomous driving. The user interface 110 may be implemented as a head-up display (HUD), cluster, audio video navigation (AVN), audio-video navigation telematics (AVNT), human-machine interface (HMI), user setting menu (USM), or the like, for example.

A sensor system 130 may include cameras, proximity sensors, radar sensors, LiDAR, and the like, and may be adapted to detect information needed for autonomous driving.

A vehicle controller 150 may include a steering controller, a braking controller, an engine or motor controller, a shift controller, and the like for controlling the vehicle's driving, steering, braking, etc.

A navigation system 140 may establish an optimal route to a destination entered by a user and may display driving status to the destination. In at least one embodiment, when the user enters a destination, the navigation system 140 can search for routes to the destination and presents one or more routes.

An autonomous driving system 120 may be adapted to use information detected by the sensor system 130 to control the vehicle controller 150 and thereby drive the vehicle autonomously along a route to a destination set by the navigation system 140. The autonomous driving system 120 may include a memory (storage medium) storing instructions and at least one processor executing the instructions.

When a user selects a route or a route change occurs while driving, the autonomous driving system 120 can determine if the set driving route includes a U-turn and provide the user with information regarding the required U-turn via the user interface 110. In some embodiments, the user may be provided with a way to select a route that involves no U-turn.

The autonomous driving system 120 can inform that a U-turn is about to be made upon approaching a U-turn point and provide information on the U-turn to be made via the user interface 110. With the vehicle waiting in a lane for a U-turn, the user interface 110 can display a status that the vehicle is waiting for the U-turn and display a simulation of the U-turn trajectory. During the U-turn maneuver, the user interface 110 can display information that is obtained during the U-turn maneuver. For example, the user interface 110 can indicate the approach clearance and lane width, e.g., approach space/clearance from within 1 to 0.5 meters to provide the user with data to confirm the autonomous U-turn driving that is reliable for peace of mind. In some embodiments, the U-turn in the making may be announced as being in progress on a micro-LED rear lamp or the like for a rear or side vehicle to view.

In an embodiment of the present disclosure, the types of U-turns can be categorized and processed as follows.

Case 1. Singular Normal U-Turn

Figure 2:
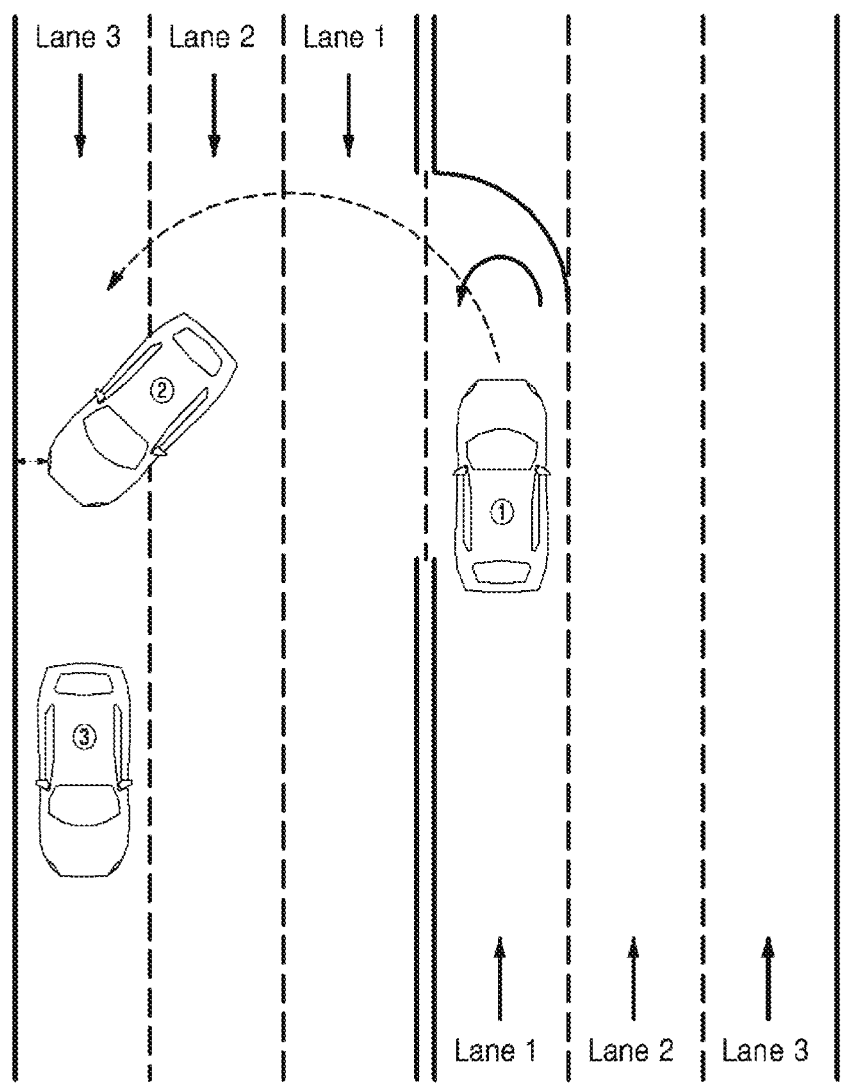
FIG. 2 is a diagram illustrating a 'standard U-turn' situation where a U-turn in one turn is feasible.

As illustrated in FIG. 2, a vehicle can be capable of making a U-turn in one turn during normal road driving, where the vehicle stops at the center of the original lane and makes a U-turn, and does not leave the sides of the road during the U-turn. This can be referred to as a 'standard U-turn'.

Case 2. Singular Normal U-Turn not Feasible

Figure 3:
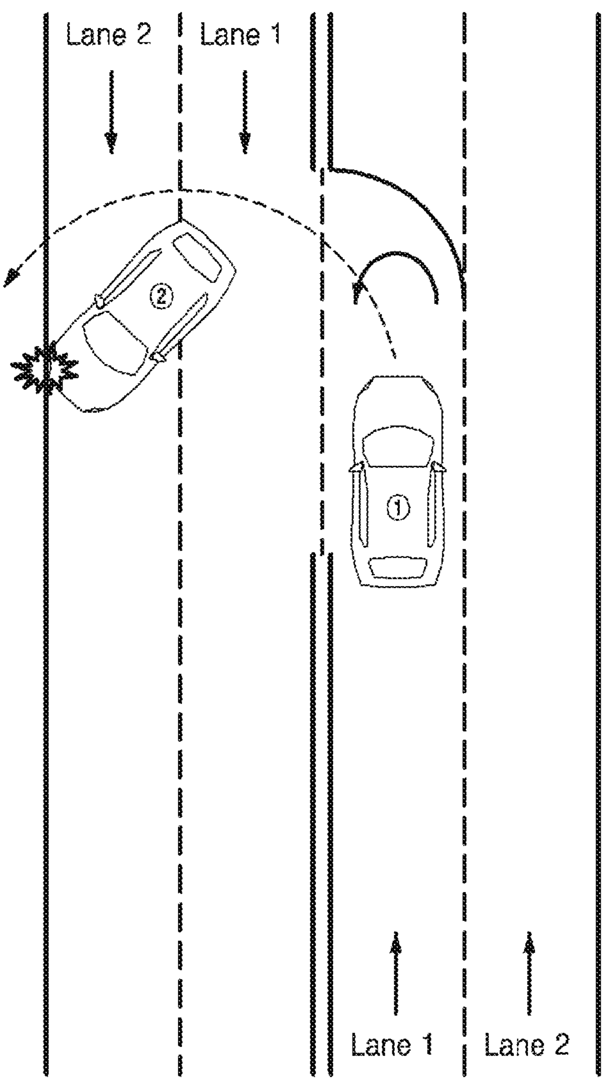
FIG. 3 is a diagram illustrating a situation where a standard U-turn is not feasible normally.

As shown in FIG. 3, when making a U-turn is not feasible in one turn during normal road driving, the vehicle may need to wait by shifting away from the center of the original lane before making a U-turn and/or to make a U-turn only after repeating reverse and forward maneuvers. This case can be subdivided into the following cases according to the situation.

Case 2.1 with In-Lane Side-Shift Wait, U-Turn Feasible in One Turn

Figure 4:
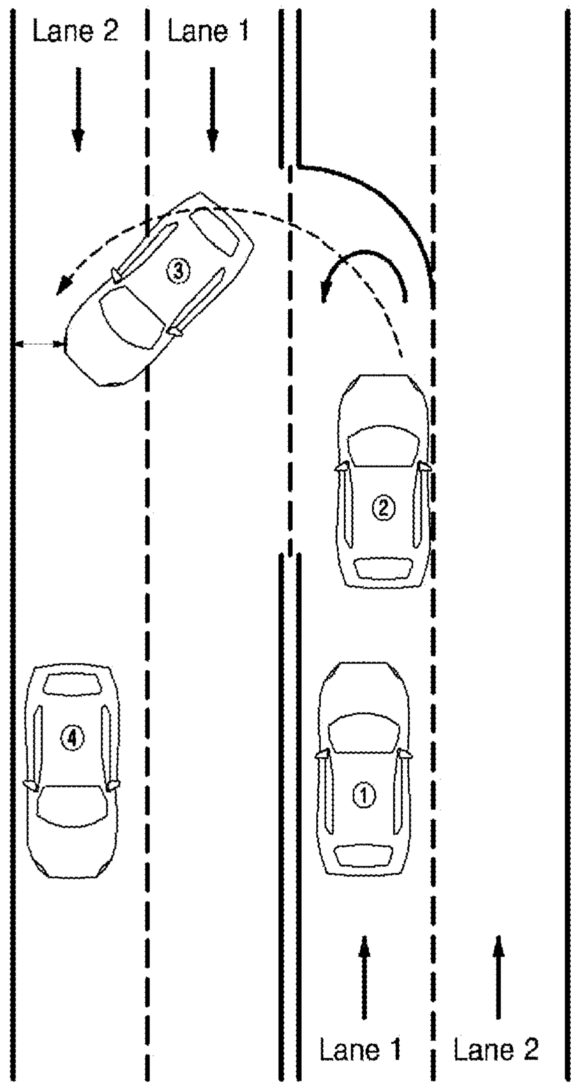
FIG. 4 is a diagram illustrating a 'side-shift U-turn' situation where a vehicle initiates a U-turn after shifting away from the center of the original lane.

A case in which the vehicle waits by shifting away from the center of the original lane before making a U-turn, and does not encroach upon the outside lane marking of the original lane and the target lane during the U-turn is illustrated in FIG. 4. This case can be referred to as a 'side-shift U-turn'. Herein, the outside lane marking may be a lane marking far from the center line.

Figure 5:
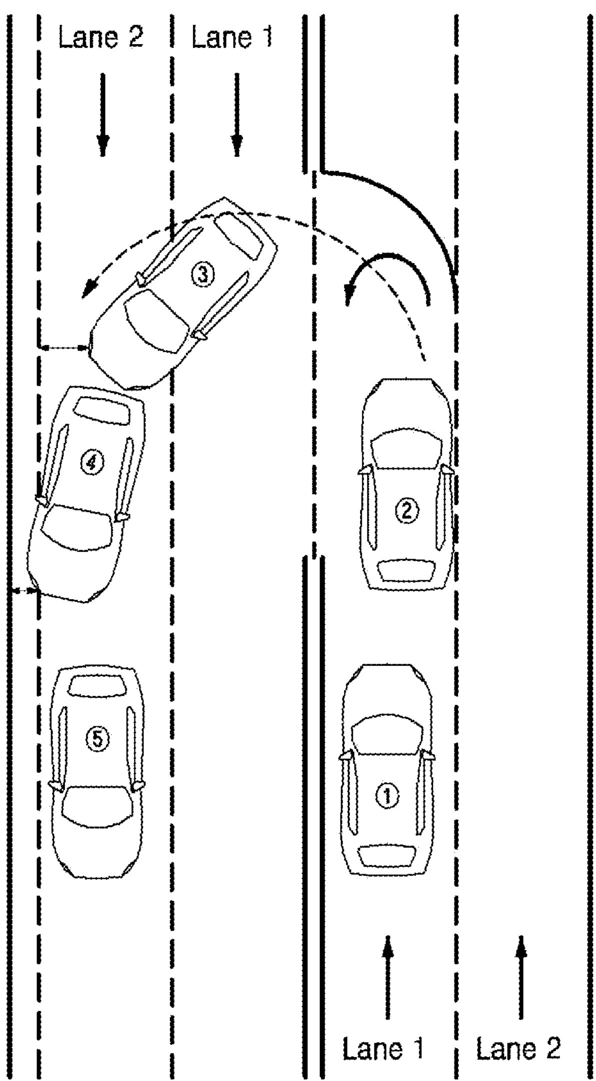
FIG. 5 is a diagram illustrating a situation of a 'side-shift extended U-turn' where a vehicle initiates a U-turn after shifting away from the center of the original lane and temporarily encroaches upon the outside lane marking of the target lane during the U-turn.

Case 2.2 with In-Lane Side-Shift Wait and Beyond-Lane Use. U-Turn Feasible in One Turn A case in which the vehicle waits by shifting away from the center of the original lane before making a U-turn, and temporarily encroaches upon the outside lane marking of the target lane during the U-turn is illustrated in FIG. 5. This case can be referred to as a 'side-shift extended U-turn'.

Figure 6:
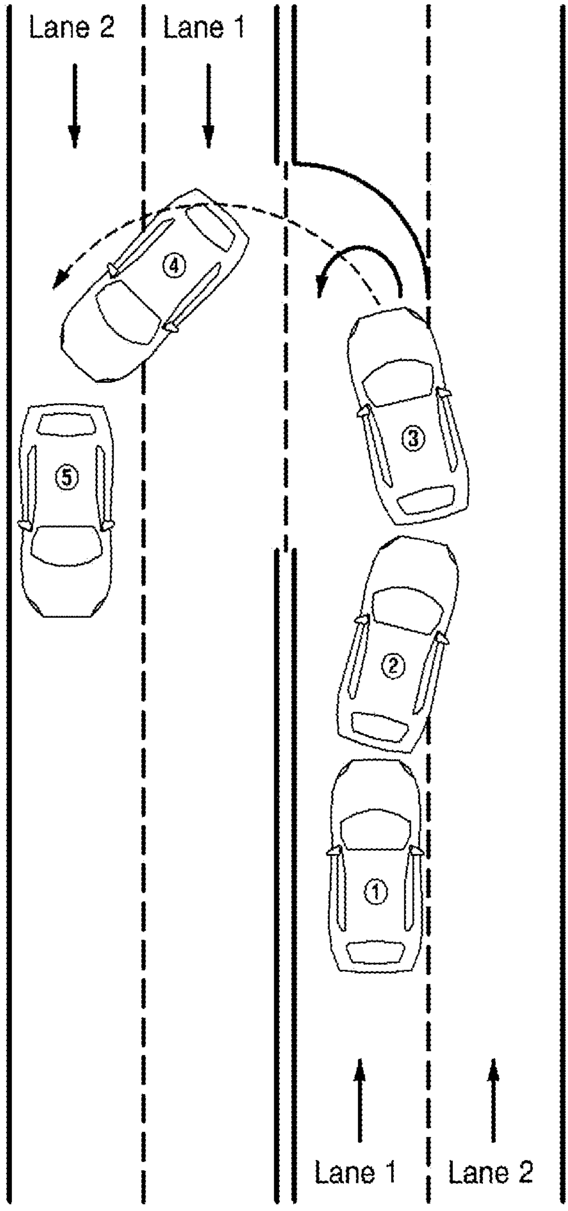
FIG. 6 is a diagram illustrating the situation of a 'lane-straddling U-turn' where a vehicle initiates a U-turn after shifting away from the center of the original lane and temporarily encroaches upon the outside lane marking of the original lane while considering a rear vehicle.

Case 2.3 with In-Lane Side-Shift Wait and Adjacent Lane Use, U-Turn Feasible in One Turn A case in which the vehicle waits by shifting away from the center of the original lane before making a U-turn, and temporarily encroaches upon the outside lane marking of the original lane during the U-turn is illustrated in FIG. 6. This case can be referred to as a 'lane-straddling U-turn'. During this maneuver, the vehicle can consider rear-approaching vehicles from the adjacent lane.

Figure 7:
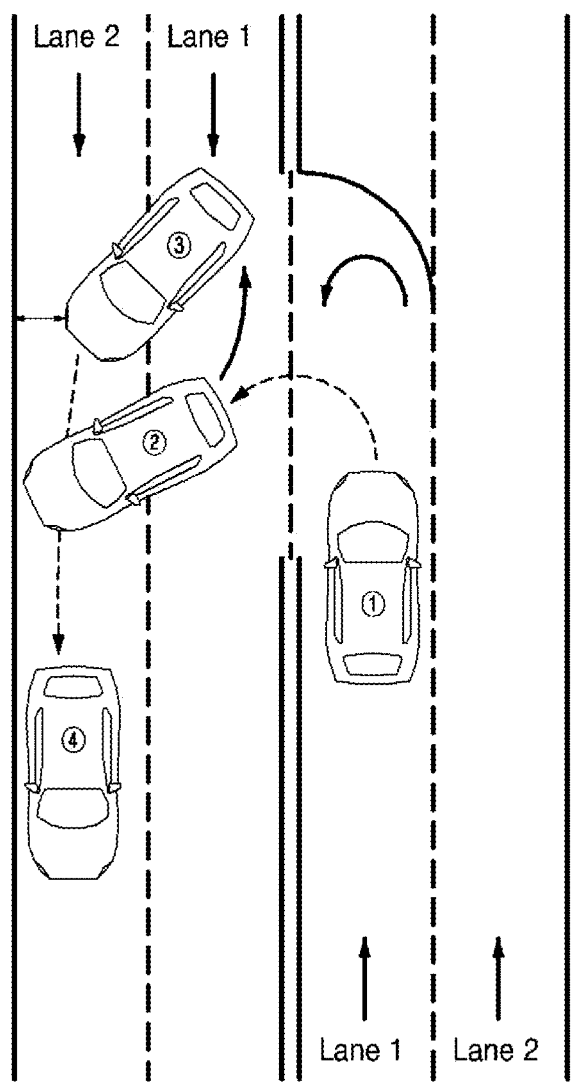
FIG. 7 is a diagram illustrating a situation of a 'multipoint U-turn' in which a vehicle can make a U-turn by one or more sets of reverse and forward maneuvers repeated during the U-turn.
Figure 8:
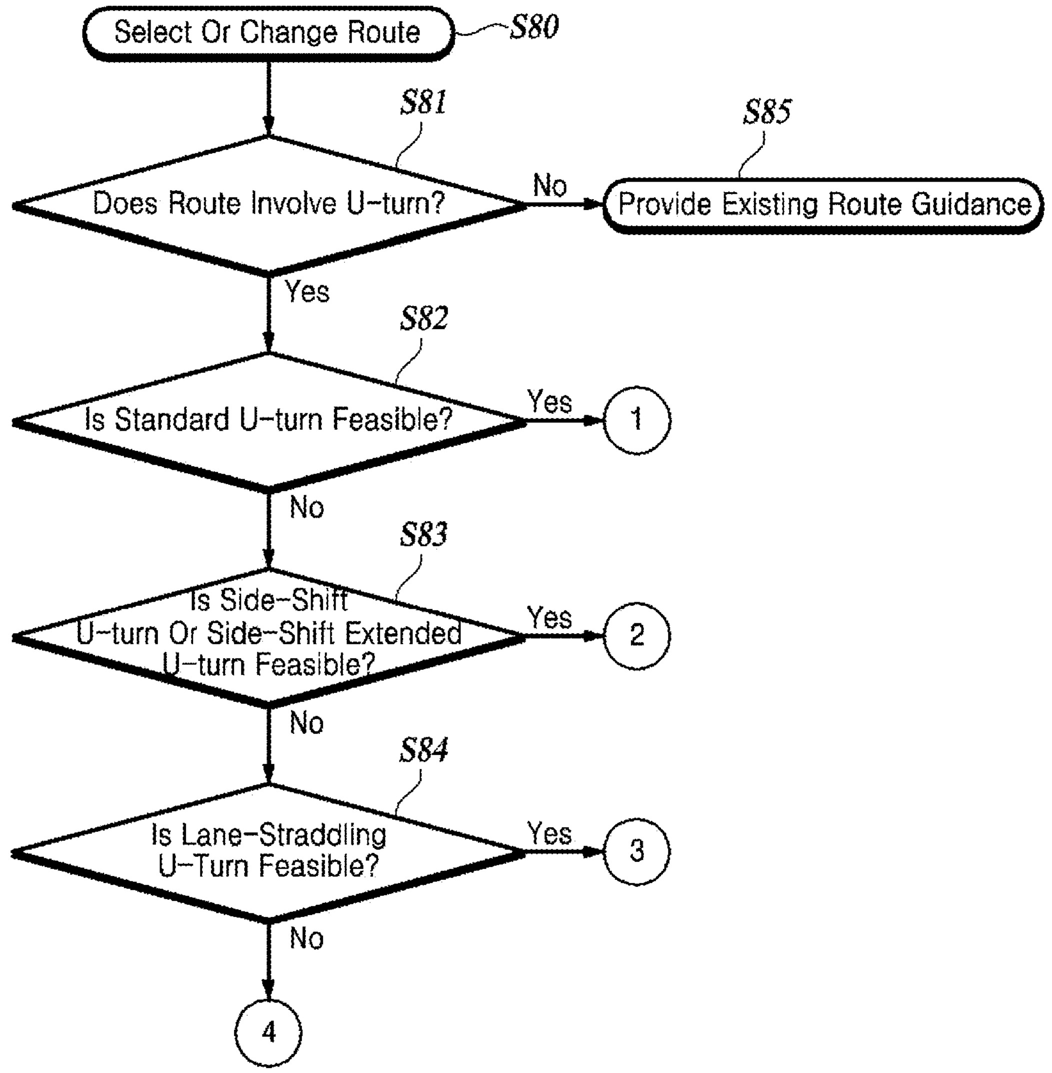
FIG. 8 is a flowchart of an operation flow of a U-turn informing method according to at least one embodiment of the present disclosure.

Case 2.4 Considering Possible Collision with Road Side During U-Turn, Reverse, Steering, and Forward Maneuvers are Used for Finalizing U-Turn A case in which the vehicle can make a U-turn only after one or more sets of reverse and forward maneuvers repeated during the U-turn is illustrated in FIG. 7. This case can be referred to as a 'multipoint U-turn'.

The autonomous driving system 120 may determine the type of U-turn based on, but is not limited to, a lane width of the road where to make the U-turn, a turning radius of the autonomous vehicle, and/or the number of lanes of the road where to make the U-turn.

In at least one embodiment of the present disclosure, depending on the type of U-turn, the driving plan of making the U-turn may be displayed to the user in advance or during the U-turn by using images or animations such as those shown in FIGS. 2 to 7.

In any combination of or all of the above cases, during the U-turn maneuver, the approach clearance and lane width (e.g., approach space/clearance from within 1 to 0.5 meters) may be indicated to the user to provide reassurance for the reliable autonomous driving of the U-turn. Additionally, during the U-turn maneuver, a micro-LED rear lamp or the like may announce that a U-turn is in progress for the vehicles behind or to the side to view.

The following describes a method for informing a U-turn according to a type of U-turn. FIGS. 8 to 12 are flowcharts illustrating example operation flows of a method of providing information on U-turn according to some embodiments of the present disclosure.

When the user enters a destination, the navigation system can search for a route to the destination and present one or more routes. When the user selects a route or a route change occurs while driving (operation S80), the autonomous driving system 120 can check whether the established driving route includes a U-turn (operation S81). If the selected route involves no U-turn, the autonomous driving system 120 can proceed with guiding the existing route (operation S85).

If the route involves a U-turn, the method can determine whether a standard U-turn is feasible based on vehicle specifications, road width, side clearance, vehicle turning radius, etc. When the selected route involves a U-turn and a standard U-turn is feasible (Case 1) (indicating 'Yes' in operation S82), the method can proceed with the operations of FIG. 9.

If a standard U-turn is not feasible, the method can determine whether a side-shift U-turn or side-shift extended U-turn is feasible without any need for reversing. When the selected route involves a U-turn and a U-turn is feasible in one turn with an in-lane side-shift wait (Case 2.1) or a U-turn is feasible in one turn with an in-lane side-shift wait and use of a space beyond of the target lane (Case 2.2) (indicating 'Yes' in operation S83), the method can proceed with the operations of FIG. 10.

If neither Case 2.1 nor Case 2.2 applies, the method can determine whether a lane-straddling U-turn is feasible without any need for reversing. When the selected route involves a U-turn and a U-turn is feasible in one turn with an in-lane side-shift wait and use of the adjacent lane to and in the same direction as the original lane (Case 2.3) (indicating 'Yes' in operation S84), the method can proceed with the operations of FIG. 11.

Figure 12:
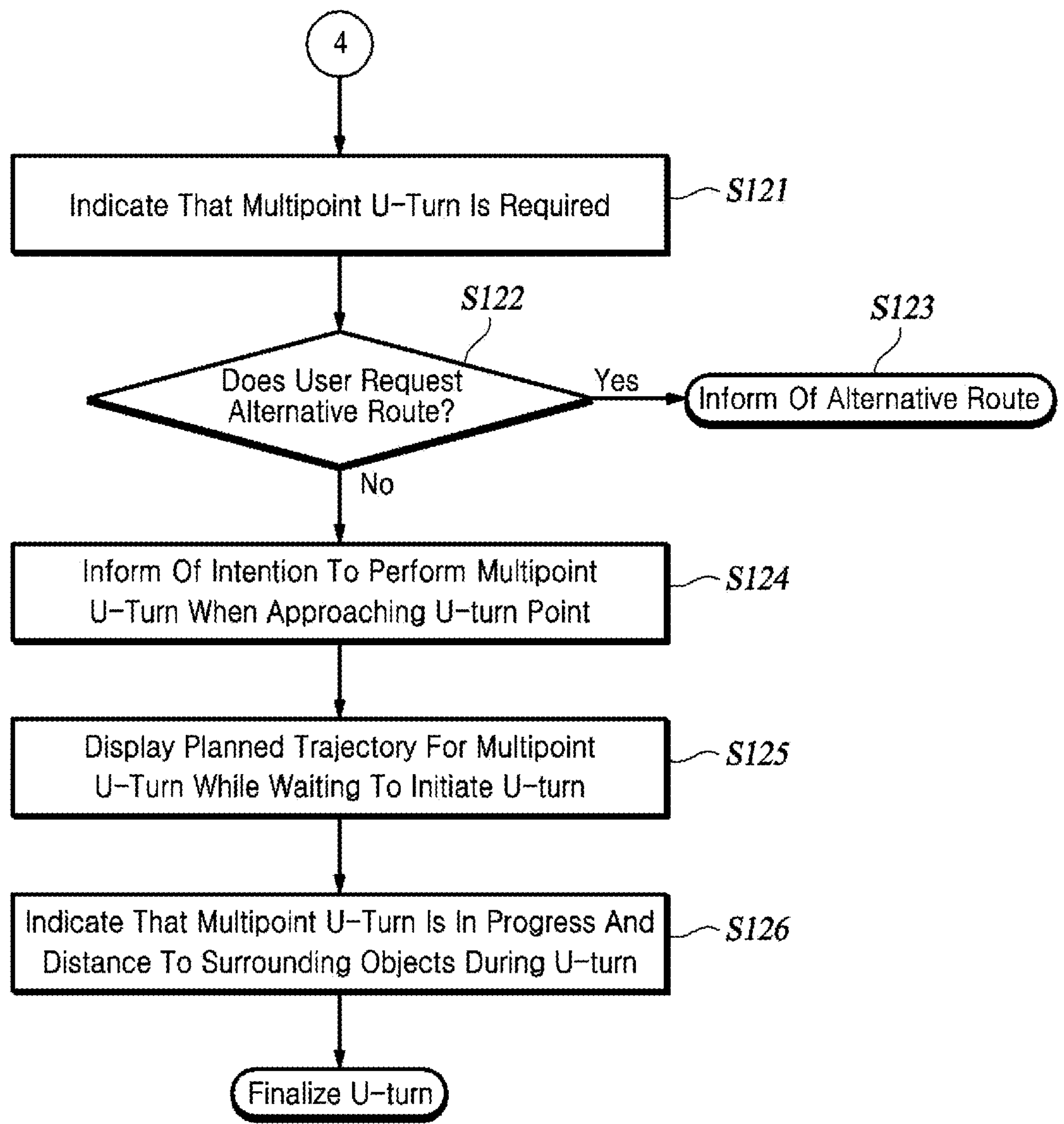
FIG. 12 is a flowchart of the operation flow in a 'multi-point U-turn' according to at least one embodiment of the present disclosure.

'No' in operation S84 corresponds to a case of using reverse, steering, and forward maneuvers for finalizing the U-turn for the concern of possible collision with a road's side (Case 2.4), and the method can proceed with the operations of FIG. 12.

Figure 9:
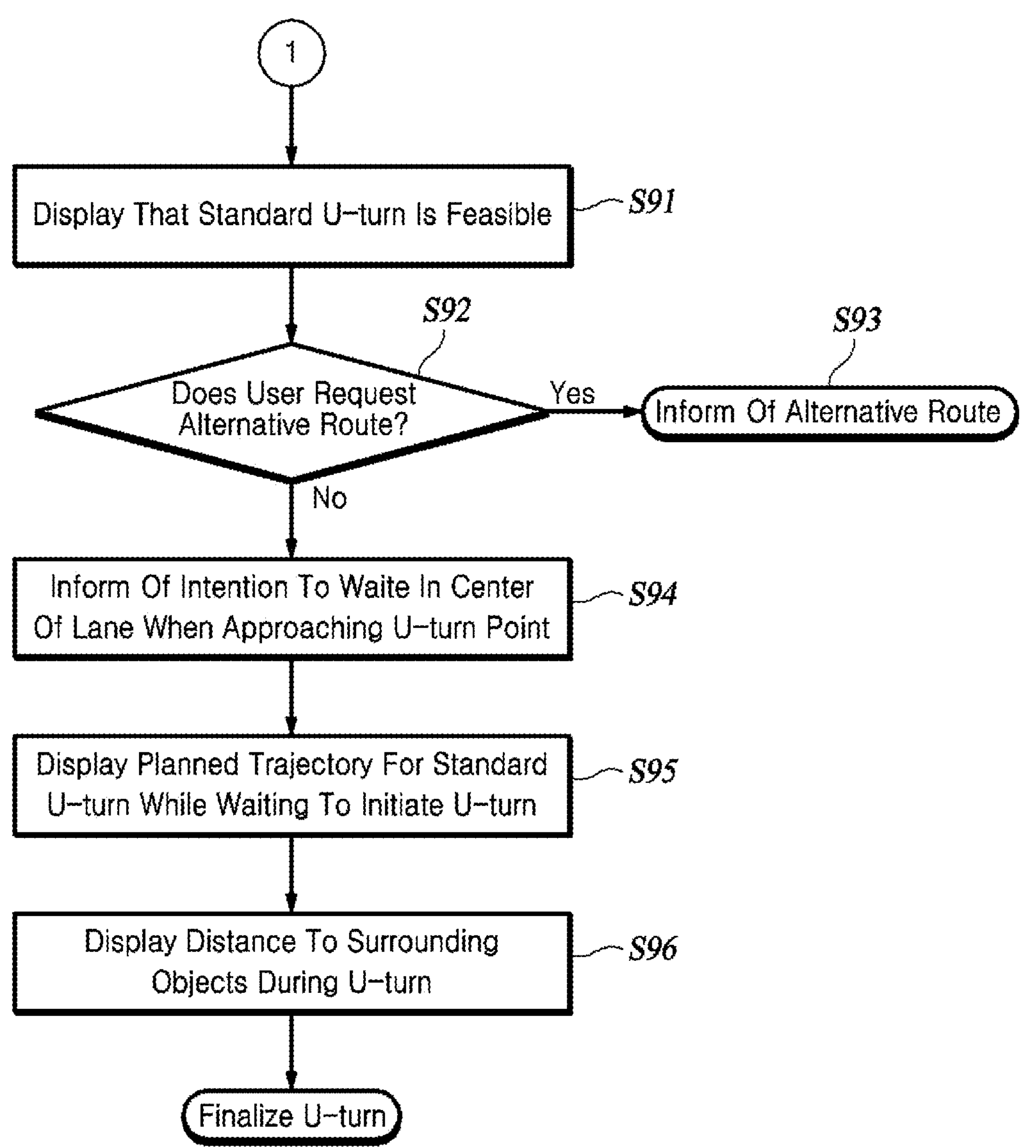
FIG. 9 is a flowchart of the operation flow a 'standard U-turn' according to at least one embodiment of the present disclosure.

FIG. 9 is the operation flow of Case 1 (i.e., standard U-turn). When the selected route involves a U-turn and a standard U-turn is determined to be feasible as shown in FIG. 2, the user interface 110 can be used to display that a standard U-turn is feasible (operation S91) and provide a way/option for selecting a route that involves no standard U-turn. Further, some embodiments may display a U-turn location menu, and when the user selects the U-turn location menu, may display a location to make the standard U-turn, the estimated time of arrival, the estimated traffic volume, the driving plan for U-turn, and the like.

If the user wants an alternative route that avoids the standard U-turn ('Yes' in operation S92), the operation can provide information on an alternative route to the destination involving no standard U-turn (operation S93). The information on the alternative route may include, for example, a map showing the changed route, additional time, additional distance, etc. If the user sees this information and requests to proceed to the changed route, the vehicle can start driving on the changed route.

If the user has not selected an alternative route that avoids the standard U-turn ('No' in operation S92), the vehicle can start driving on the established route. As the vehicle approaches a point that needs a standard U-turn, the user interface 110 can display information on the U-turn as it informs that a standard U-turn is about to begin with imminent waiting in the center of the lane a certain amount of time, e.g., 10 seconds before reaching the U-turn point (operation S94). For example, the cluster may indicate that a standard U-turn is about to be made, and the audio-video navigation telematics (AVNT) may indicate how to proceed with the U-turn.

With the vehicle waiting in the lane for the U-turn (e.g., FIG. 2 at ①), the user interface 110 can display the status that the vehicle is waiting for the standard U-turn and a simulation of a planned trajectory for the standard U-turn (operation S95). For example, the cluster may display that the vehicle is waiting for the standard U-turn, and the AVNT may display a simulation screen of how to proceed with the U-turn.

During the U-turn maneuver (e.g., FIG. 2 at ②), the user interface 110 can display the status that the standard U-turn is in progress and the distance between the vehicle and front or side objects of the route (operation S96). For example, the cluster may indicate that the standard U-turn is in progress, and the AVNT may indicate the distance between the vehicle and the front or side objects of the route.

Figure 10:
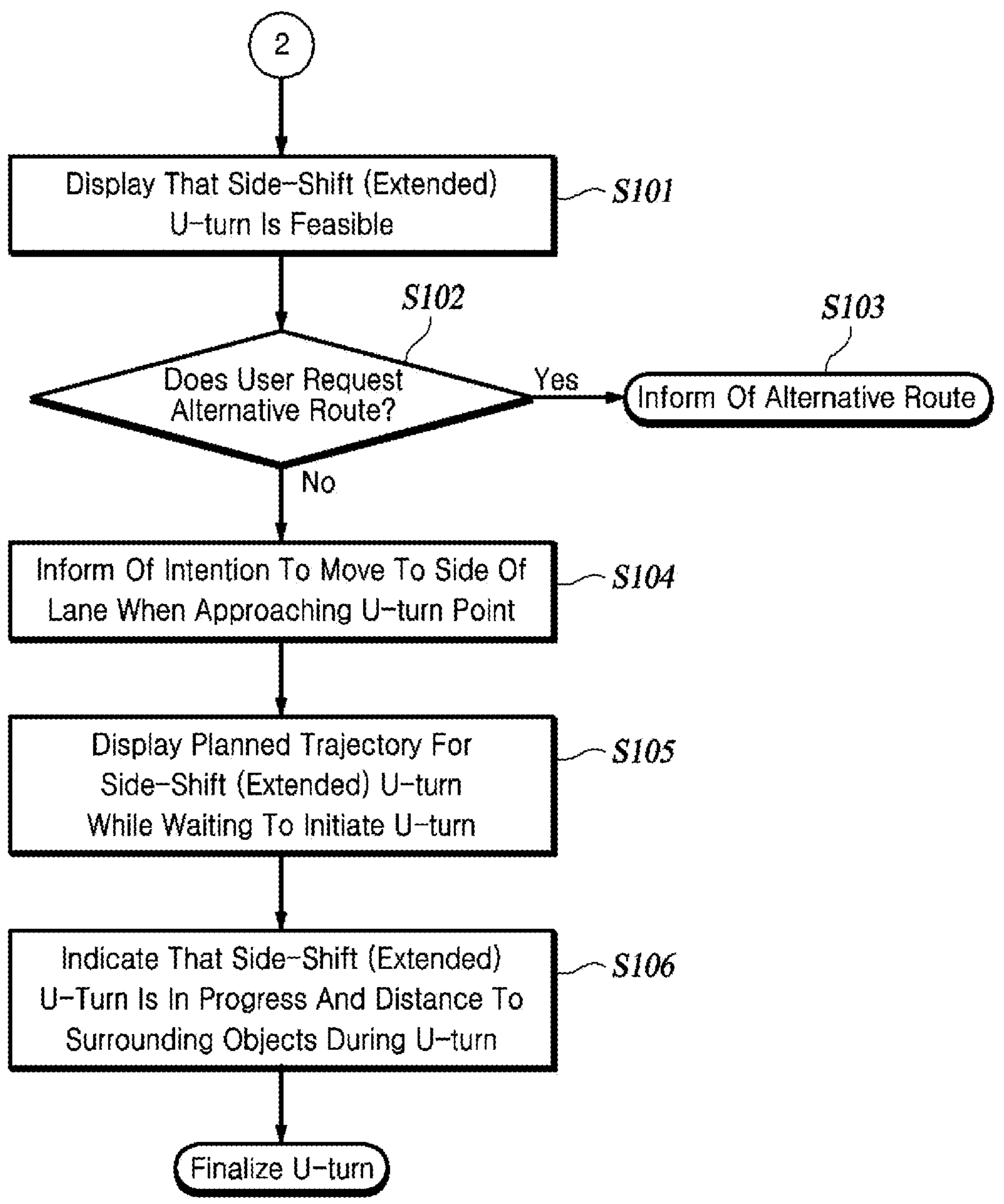
FIG. 10 is a flowchart of the operation flow in a 'side-shift U-turn' and 'side-shift extended U-turn' according to at least one embodiment of the present disclosure.

FIG. 10 is the operation flow of Case 2.1 (i.e., side-shift U-turn) and Case 2.2 (i.e., side-shift extended U-turn).

As illustrated in FIGS. 4 and 5, where a U-turn is feasible in one turn with in-lane side-shift wait (Case 2.1) or a U-turn is feasible in one turn with in-lain side-shift wait and use of a space beyond of the target lane (Case 2.2), the user interface 110 can display the status that a side-shift U-turn (or side-shift extended U-turn) is feasible, the location of the U-turn, and provide a way/option for selecting a route that does not include either the side-shift U-turn, the side-shift extended U-turn, or both (operation S101). Additionally, some embodiments may display a U-turn location menu, and when the user selects the U-turn location menu, may display the location to make the side-shift U-turn (or side-shift extended U-turn) and estimated time of arrival, estimated traffic volume, driving plan for making the U-turn, etc.

If the user wants to take an alternative route to avoid the side-shift U-turn and/or the side-shift extended U-turn (Yes' in operation S102), the operation can provide information on a feasible alternative route to the destination (operation S103). The information on the alternative route may include, for example, a map showing the changed route, additional time, additional distance, etc. If the user views this information and requests to proceed to the changed route, the vehicle can start driving on the changed route.

If the user does not select an alternative route to avoid the U-turn ('No' in operation S102), the vehicle can start driving on the established route. As the vehicle approaches a point that needs a side-shift U-turn or side-shift extended U-turn, the user interface 110 can display a certain amount of time, e.g., 10 seconds before reaching the U-turn point, information on the U-turn as it informs that the vehicle is about to move to side of the current lane and the side-shift U-turn or the side-shift extended U-turn will be executed (operation S104). For example, the cluster may indicate that the side-shift U-turn or the side-shift extended U-turn is about to be made, and the audio video navigation telematics (AVNT) may indicate how the side-shift U-turn or the side-shift extended U-turn will be made.

When the vehicle is waiting with in-lane deflection for a U-turn (e.g., FIG. 4 at ② or FIG. 5 at ②), the user interface 110 may display the status that the vehicle is waiting for the side-shift U-turn or the side-shift extended U-turn and a simulation of a planned trajectory for the side-shift U-turn or the side-shift extended U-turn (operation S105). For example, the cluster may display that the vehicle is waiting to initiate the U-turn, and the AVNT may display a simulation of the route of the U-turn.

During the U-turn maneuver (e.g., FIG. 4 at ③, ④ or FIG. 5 at ③, ④, ⑤), the user interface 110 may display the status that the side-shift U-turn or the side-shift extended U-turn is in progress and the distance between the vehicle and front or side objects of the route (operation S106). For example, the cluster may indicate that the side-shift U-turn or the side-shift extended U-turn is in progress, and the AVNT may indicate the distance between the vehicle and the front or side objects. Additionally, in the case of a side-shift extended U-turn as illustrated in FIG. 5, the AVNT may also indicate the amount of overhang of an overhang road. Additionally, in some embodiments, the AVNT may display footage from a side camera or a rear camera during the U-turn maneuver on screen.

Figure 11:
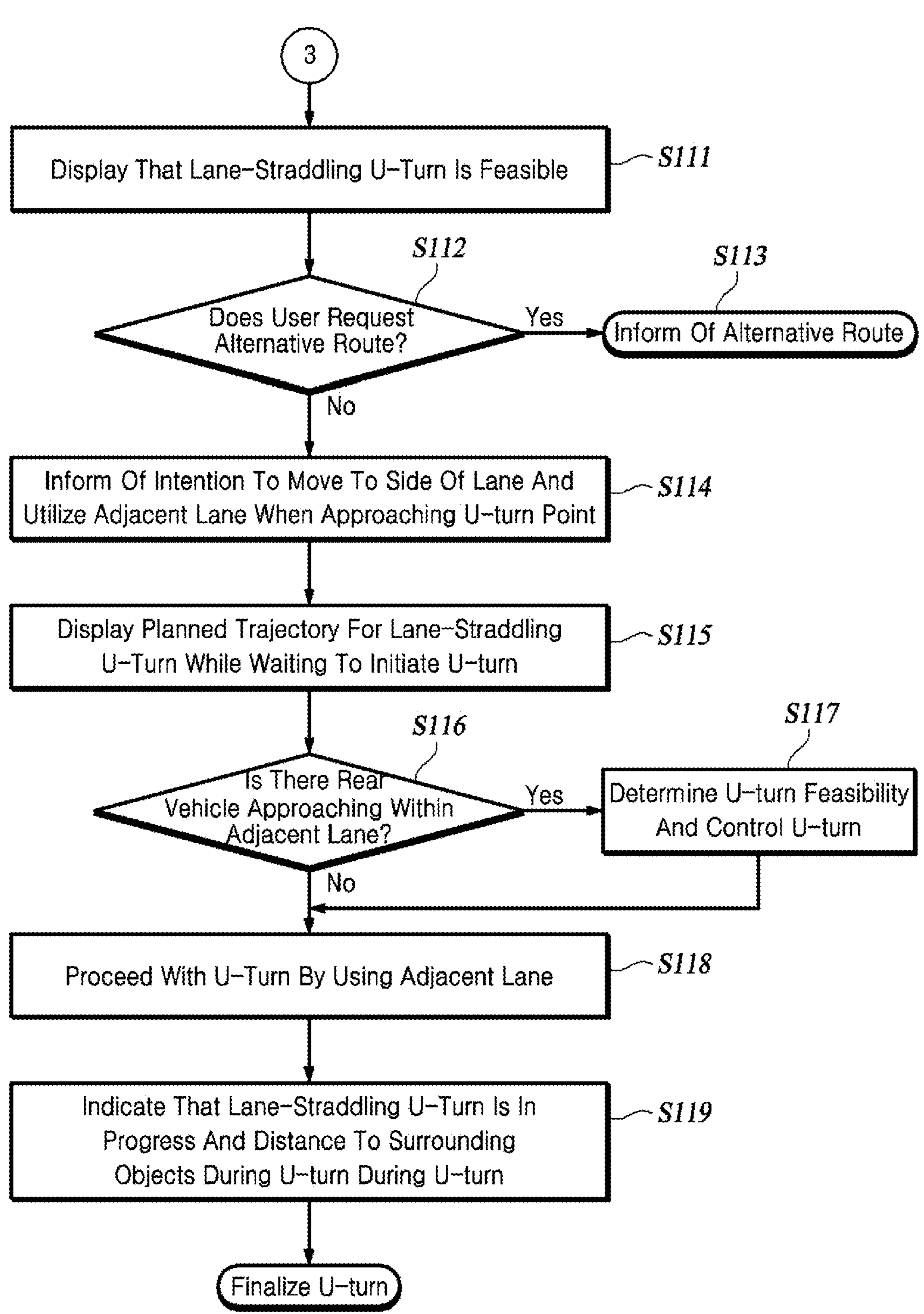
FIG. 11 is a flowchart of the operation flow in a 'lane-straddling U-turn' according to at least one embodiment of the present disclosure.

FIG. 11 is the operation flow of case 2.3 (i.e., lane-straddling U-turn).

As shown in FIG. 6, when the vehicle needs to wait by shifting away from the center of the original lane before making a U-turn, and temporarily encroach upon the outside lane of the original lane while taking into account a rear vehicle, the operation can cause the user interface 110 to display the status that a lane-straddling is feasible along with the location of the U-turn, and provide a way/option for the user to select a route involving no lane-straddling U-turn (operation Sill). Additionally, some embodiments may display a U-turn location menu, and when the user selects the U-turn location menu, may display the location to make the lane-straddling U-turn and estimated time of arrival, estimated traffic volume, U-turn method, etc.

If the user wants an alternative route to avoid the lane-straddling U-turn ('Yes' in operation S112), the operation can provide information on a feasible alternative route to the destination involving no lane-straddling U-turn (operation S113). The information on the alternative route may include, for example, a map showing the changed route, additional time, additional distance, etc. If the user sees this information and requests to proceed to the changed route, the vehicle can start driving on the changed route.

If the user has not selected another route to avoid the U-turn ('No' in operation S112), the vehicle can start driving on the established route. As the vehicle in operation approaches a point that needs a lane-straddling U-turn, the user interface 110 can indicate, a certain amount of time e.g., 10 seconds before reaching the U-turn point, that the vehicle is about to move to side of the current lane and the U-turn will be made using the adjacent lane that is next to and in the same direction as the current lane (operation S114). For example, the cluster may indicate that a lane-straddling U-turn is about to be made, and the audio video navigation telematics (AVNT) may indicate how to proceed with the lane-straddling U-turn. Further, the autonomous driving system 120 can control the vehicle to get into in-lane side-shift waiting as it approaches the U-turn point, and also control the vehicle to ensure that there is a forward clearance to allow for the lane-straddling U-turn.

When the vehicle is in in-lane side shift waiting for the U-turn (e.g., FIG. 6 at @), the user interface 110 can display the status that the vehicle waiting for the lane-straddling U-turn and that a forward clearance needs to be secured and display a simulation of a planned trajectory for the lane-straddling U-turn (operation S115). For example, the cluster may display that the vehicle is waiting to initiate the lane-straddling U-turn, and the AVNT may display a simulation screen of the U-turn route.

When making a U-turn, the autonomous driving system 120 can take account of a rear vehicle to proceed with the U-turn. For example, the autonomous driving system 120 can check whether a rear vehicle is approaching in the adjacent lane that is next to and in the same direction as the current lane (operation S116), and if the rear vehicle is approaching ('Yes' in operation S116), determine whether the U-turn is feasible, and control the U-turn, for example, by suspending, delaying, adjusting the speed of the U-turn (operation S117). In other words, if a rear vehicle is approaching in the adjacent lane, the autonomous driving system 120 can consider the approaching speed and distance of the rear vehicle and control the U-turn, for example, by suspending the U-turn, briefly delaying the U-turn, or adjusting the speed of the U-turn.

When operation S116 determines that the rear vehicle is not approaching in the right lane, or when operation S117 determines that a U-turn is feasible, the operation can perform a lane-straddling U-turn by using the adjacent lane (operation S118). In the beginning of a U-turn by using the adjacent lane (e.g., FIG. 6 at ②, ③), the user interface 110 can indicate the status that a lane-straddling U-turn is in progress and the distance between the vehicle and front or side objects of the route. For example, the cluster may indicate that a lane-straddling U-turn is in progress, and the AVNT may indicate the distance between the vehicle and the front or side objects. While in the U-turn using the adjacent lane, the autonomous driving system 120 can continue to monitor whether a rear vehicle is approaching and perform controlling, for example, by suspending the U-turn, briefly delaying the U-turn, reversing, or adjusting the speed of making the U-turn.

When the U-turn is in progress (FIG. 6 at ④, ⑤), the operation can display the status that a 'side-lane outstep U-turn' is in progress and the distance between the vehicle and front or side objects of the route (operation S119). For example, the cluster may indicate that a lane-straddling U-turn is in progress, and the AVNT may indicate the distance between the vehicle and the front or side objects, the overhang amount of an overhang road, etc. Additionally, in some embodiments, the AVNT may display footage from a side camera or a rear camera during the U-turn maneuver on screen.

FIG. 12 is the operation flow of Case 2.4 (i.e., multipoint U-turn). Where none of a standard U-turn, side-shift U-turn, side-shift extended U-turn, or lane-straddling U-turn is feasible, the vehicle can make a U-turn by one or more sets of reverse and forward maneuvers repeated during the U-turn.

If the situation requires making a multipoint U-turn, the operation can cause the user interface 110 to indicate the fact that a multipoint-turn U-turn is necessary along with the location of the U-turn and provide a way/option for selecting a route that involves no multipoint U-turn (operation S121). Additionally, some embodiments may display a U-turn location menu, and when the user selects the U-turn location menu, may display the location to make the U-turn and estimated time of arrival, estimated traffic volume, a driving plan for the U-turn, and the like.

If the user wants an alternative route to avoid the multipoint U-turn ('Yes' in operation S122), the operation can provide information on an alternative route to the destination that involves no multipoint U-turn (operation S123). The information on the alternative route may include, for example, a map showing the changed route, additional time, additional distance, etc. If the user sees this information and requests to proceed to the changed route, the vehicle can start driving on the changed route.

If the user has not selected an alternative route to avoid the multipoint U-turn ('No' in operation S122), the vehicle can start driving on that route. While driving, if the vehicle approaches a point that requires a multipoint U-turn, the user interface 110 can indicate that a multipoint U-turn is about to begin a certain amount of time, e.g., 10 seconds before reaching the U-turn point (operation S124). For example, the cluster may indicate that a multipoint U-turn is about to be made, and the audio video navigation telematics (AVNT) may indicate how to proceed with the multipoint U-turn.

While waiting on a lane for a U-turn (FIG. 7 at ①), the user interface 110 may display the status that the vehicle waiting for the multipoint U-turn and a simulation of a planned trajectory for the multipoint U-turn (operation S125). For example, the cluster may display the status that the vehicle is waiting to initiate the multipoint U-turn, and the AVNT may display a simulation of the route of the U-turn. The cluster or AVNT may also display the number of forward and reverse controls.

During the U-turn maneuver (FIG. 7 at ②, ③, and ④), the user interface 110 can indicate that a multipoint U-turn is in progress and the distance between the vehicle and front or side objects of the route (operation S126). For example, the cluster may indicate that a multipoint U-turn is in progress, and the AVNT may indicate the distance between the vehicle and the front or side objects of the vehicle. Additionally, some embodiments may display footage from a side camera or rear camera during the U-turn maneuver on screen. The autonomous driving system 120 can continue to monitor whether a vehicle is approaching from the front during the U-turn maneuver moving forward and reverse, and perform controls such as suspending the U-turn, briefly delaying the U-turn, reversing, or adjusting the speed of making the U-turn.

The apparatus or method according to the present disclosure may have the respective components arranged to be implemented as hardware or software, or hardware and software combined. Additionally, each component may be functionally implemented by software, and a microprocessor may execute the function by software for each component when implemented.

Various illustrative implementations of the systems and methods described herein may be realized by digital electronic circuitry, integrated circuits, field-programmable gate arrays (FPGAs), application-specific integrated circuits (ASICs), computer hardware, firmware, software, and/or their combination. These various implementations can include those realized in one or more computer programs executable on a programmable system. The programmable system can include at least one programmable processor coupled to receive and transmit data and instructions from and to a storage system, at least one input device, and at least one output device, where the programmable processor may be a special-purpose processor or a general-purpose processor. The computer programs (which are also known as programs, software, software applications, or code) can contain instructions for a programmable processor and can be stored in a "computer-readable recording medium."

The computer-readable recording medium can include any type of recording device on which data that can be read by a computer system are recordable. Examples of computer-readable recording mediums include non-volatile or non-transitory media such as a ROM, CD-ROM, magnetic tape, floppy disk, memory card, hard disk, optical/magnetic disk, storage devices, and the like. The computer-readable recording mediums may further include transitory media such as a data transmission medium. Further, the computer-readable recording medium can be distributed in computer systems connected via a network, where the computer-readable codes can be stored and/or executed in a distributed mode.

Although the operations in the respective flowcharts/timing charts are described to be sequentially performed, they merely instantiate the technical idea of some embodiments of the present disclosure. Therefore, a person having ordinary skill in the pertinent art could perform the operations by changing the sequences described in the respective flowcharts/timing charts or by performing two or more of the operations in parallel, and hence the operations in the respective flowcharts/timing charts are not limited to the illustrated chronological sequences.

According to at least one embodiment of the present disclosure, providing the user with information about the U-turn before and during the U-turn can provide the user with peace of mind when the autonomous vehicle makes the U-turn.

According to at least one embodiment of the present disclosure, even if the route to a destination requires a U-turn, the user can be given the option to select a different route that involves no U-turn or different type of U-turn, thereby can increase the user's choices.

According to at least one embodiment of the present disclosure, when a U-turn is required for the autonomous vehicle to proceed on a route, an appropriate U-turn type can be selected based on vehicle and road conditions, and optimal information can be provided to the user based on the selected U-turn type.

According to at least one embodiment of the present disclosure, when a U-turn is required for the autonomous vehicle to proceed on a route, the selected U-turn method can be based on the vehicle and road conditions and can be delivered as an image or animation in advance, which can allow the user to be intuitively informed about the U-turn.

According to at least one embodiment of the present disclosure, by indicating a front approach gap and a lane width, etc. during the U-turn maneuver, the user can confirm them with data, ensuring a reliable autonomous U-turn driving experience.

According to at least one embodiment of the present disclosure, the U-turn in progress can be announced by a micro-LED rear lamp or the like for a rear vehicle or a side vehicle to see it, thereby can reduce possible accidents and facilitate the passage of surrounding vehicles.

Feature combinations and embodiments of the present disclosure are not limited to those mentioned above, and other unmentioned features, combinations, and embodiments can be understood by those skilled in the art based on the above description.

Although example embodiments of the present disclosure have been described for illustrative purposes, those skilled in the art will appreciate that various modifications, additions, and substitutions are possible, without departing from ideas and scopes of the present disclosure. Therefore, example embodiments of the present disclosure have been described for the sake of brevity and clarity. Scopes of the present disclosure are not limited by the example illustrations. Accordingly, one of ordinary skill can understand scopes of the present disclosure are not to be limited by the above explicitly-described example embodiments but by the following claims and equivalents thereof.

What is claimed is:

1. A method, performed by an apparatus of a vehicle, the method comprising:

based on a first event in which the vehicle approaches a U-turn point, displaying first information regarding a U-turn, wherein the first information includes an indication that the U-turn is to be made and a U-turn type of the U-turn, and wherein the U-turn type is determined from among a plurality of U-turn types, each of which executes a maneuver of steering the vehicle to cross a center line at the U-turn point to move from a current lane to a target lane;

providing an interface configured to allow a user to select an alternate route that requires a different U-turn type from the determined U-turn type; and based on a second event in which the vehicle waits to initiate the U-turn, displaying second information regarding the U-turn to be made.

2. The method of claim 1, further comprising:

determining whether at least one U-turn is required on a driving route to a destination set by a user;

based on a determination that at least one U-turn is required, displaying third information on the required U-turn; and providing an interface configured to allow the user to select an alternate route that does not require any U-turns.

3. The method of claim 1, wherein the plurality of U-turn types comprises:

a first U-turn type that allows the vehicle to complete the U-turn without reversing; and a second U-turn type that requires the vehicle to perform at least one reverse movement to complete the U-turn.

4. The method of claim 1, wherein the plurality of U-turn types comprises:

a third U-turn type that allows the vehicle to initiate the U-turn from a center of an original lane; and a fourth U-turn type that requires the vehicle to be positioned towards a side of the original lane before crossing the center line.

5. The method of claim 4, wherein the fourth U-turn type comprises:

a fifth U-turn type that requires the vehicle to temporarily encroach upon a first outside lane marking of the target lane after crossing the center line; and a sixth U-turn type that requires the vehicle to temporarily encroach upon a second outside lane marking of the current lane during before crossing the center line.

6. The method of claim 1, wherein the second information comprises a planned U-turn trajectory corresponding to the U-turn type.

7. The method of claim 1, further comprising displaying fourth information on the U-turn in progress while making the U-turn.

8. The method of claim 7, wherein the fourth information comprises a distance to a surrounding object and a distance to a lane marking.

9. The method of claim 7, further comprising indicating that the U-turn is in progress to a surrounding vehicle using a lamp mounted on the vehicle while making the U-turn.

10. The method of claim 1, further comprising determining the U-turn type from among a U turn type set the plurality of U-turn types based on a lane width of a road where the U-turn is to be made, a number of lanes of the road where the U-turn is to be made, a turning radius of the vehicle, and a front overhang of the vehicle.

11. A vehicle, comprising:

one or more processors; and a storage medium storing computer-readable instructions that, when executed by the one or more processors, enable the one or more processors to:

based on a first event in which the vehicle approaches a U-turn point, control a user interface to output first information regarding a U-turn, wherein the first information includes an indication that the U-turn is to be made and a U-turn type, and wherein the U-turn type is determined from among a plurality of U-turn types, each of which executes a maneuver of steering the vehicle to cross a center line at the U-turn point to move from a current lane to a target lane;

provide an interface configured to allow a user to select an alternate route that requires a different U-turn type from the determined U-turn type; and based on a second event in which the vehicle waits to initiate the U-turn, control the user interface to output second information regarding the U-turn to be made.

12. The vehicle of claim 11, wherein the instructions further enable the one or more processors to control the user interface to:

based on a determination that at least one U-turn is required on a driving route to a destination set by a user, output third information regarding the required U-turn; and provide an interface configured to allow the user to select an alternate route that does not require any U-turns.

13. The vehicle of claim 11, wherein the plurality of U-turn types comprises:

a first U-turn type that allows the vehicle to complete the U-turn without reversing; and a second U-turn type that requires the vehicle to perform at least one reverse movement to complete the U-turn.

14. The vehicle of claim 11, wherein the plurality of U-turn types comprises:

a third U-turn type that allows the vehicle to initiate the U-turn from a center of an original lane; and a fourth U-turn type that requires the vehicle to be positioned towards a side of the original lane before crossing the center line.

15. The vehicle of claim 14, wherein the fourth U-turn type comprises:

a fifth U-turn type that requires the vehicle to temporarily encroach upon a first outside lane marking of the target lane after crossing the center line; and a sixth U-turn type that requires the vehicle to temporarily encroach upon a second outside lane marking of the original lane before crossing the center line.

16. The vehicle of claim 11, wherein the second information comprises a planned U-turn trajectory corresponding to the U-turn type.

17. The vehicle of claim 11, wherein the instructions further enable the one or more processors to determine the U-turn type from among the plurality of U-turn types based on a lane width of a road where the U-turn is to be made, a number of lanes of the road where the U-turn is to be made, a turning radius of the vehicle, and a front overhang of the vehicle.

18. A vehicle, comprising:

one or more processors; and a storage medium storing computer-readable instructions that, when executed by the one or more processors, enable the one or more processors to:

based on a first event in which the vehicle approaches a U-turn point, control a user interface to output first information regarding a U-turn, wherein the first information includes an indication that the U-turn is to be made and a U-turn type, and wherein the U-turn type is determined from among a plurality of U-turn types, each of which executes a maneuver of steering the vehicle to cross a center line at the U-turn point to move from a current lane to a target lane;

provide an interface configured to allow a user to select an alternate route that requires a different U-turn type from the determined U-turn type; and based on a second event in which the vehicle waits to initiate the U-turn, control the user interface to output second information regarding the U-turn to be made;

wherein the instructions further enable the one or more processors to control the user interface to display fourth information on the U-turn in progress.

19. The vehicle of claim 18, wherein the fourth information comprises a distance to a surrounding object and a distance to a lane marking.

20. The vehicle of claim 18, wherein the instructions further enable the one or more processors to control a lamp mounted on the vehicle to indicate that the U-turn is in progress to a surrounding vehicle while making the U-turn.

* * * * *